United States Patent [19]

Frazier et al.

[11] 4,334,215
[45] Jun. 8, 1982

[54] CONTINUOUS HEAT AND PRESSURE SURVEILLANCE SYSTEM FOR PNEUMATIC TIRES

[75] Inventors: John D. Frazier; Wilmur G. Grandfield, both of Godfrey; Michael G. Brainerd, Grafton, all of Ill.

[73] Assignee: Tire-Tronics, Inc., Alton, Ill.

[21] Appl. No.: 34,427

[22] Filed: Apr. 27, 1979

[51] Int. Cl.³ .................. H04Q 7/00; G08B 1/08; B60C 23/00
[52] U.S. Cl. .................. 340/539; 340/58; 200/61.22; 116/34 R; 73/146.2
[58] Field of Search ........... 340/539, 58, 57, 177 VC, 340/177 VA, 182, 52 R, 510, 506, 501; 200/61.25, 61.22, 61.26; 73/146.5, 146.4, 146.2, 398 R; 116/34 R, 34 A, 34 B; 455/260, 263, 95, 99, 101; 375/81, 82, 119, 120

[56] References Cited

U.S. PATENT DOCUMENTS

| | | | |
|---|---|---|---|
| 2,554,594 | 5/1951 | Shea | 340/58 |
| 2,860,321 | 11/1958 | Strickland et al. | 340/58 |
| 3,281,784 | 10/1966 | Farthing | 340/58 |
| 3,662,335 | 5/1972 | Fritze | 340/58 |
| 3,710,314 | 1/1973 | Bell et al. | 200/61.25 |
| 3,786,413 | 1/1974 | Ross et al. | 340/58 |
| 3,787,806 | 1/1974 | Church | 340/58 |
| 3,810,090 | 5/1974 | Davis Jr., et al. | 340/58 |
| 3,852,717 | 12/1974 | Hosaka et al. | 340/58 |
| 3,875,558 | 4/1975 | Samples | 340/58 |
| 3,982,225 | 9/1976 | Schlanzky | 200/61.25 |
| 4,004,270 | 1/1977 | Claxton et al. | 200/61.25 |
| 4,025,915 | 5/1977 | Enemark | 340/510 |
| 4,067,235 | 1/1978 | Markland et al. | 73/146.5 |
| 4,090,172 | 5/1978 | Vesnic | 340/58 |
| 4,117,405 | 9/1978 | Martinez | 455/260 |
| 4,160,234 | 7/1979 | Karbo et al. | 73/146.5 |

Primary Examiner—John W. Caldwell, Sr.
Assistant Examiner—Donnie L. Crosland
Attorney, Agent, or Firm—Jerome A. Gross

[57] ABSTRACT

For use with trucks, aircraft and other motor vehicles, circuit apparatus signals, from within a pneumatic tire to a display near the operator, an abnormal tire pressure or temperature. A monitoring transmitter within the tire utilizes a negative coefficient thermistor maintained in thermal contact with the tire to sense an abnormal high temperature, and a bellows-type pressure sensor, internally pressurized to approximately the normal tire pressure, to sense abnormal high or low pressures. If one of these abnormal conditions is sensed, power is supplied from a long-lifetime battery to an FM transmitter modulated by a different selected frequency for each tire, selected by a potentiometer marked for each frequency. These circuit elements are on a circuit board secured to the inside of the tire by an overlaying elastic adhesive material which absorbs shock and thermally insulates the thermistor from the air within the tire. A receiver near the operator detects any transmitted signals and determines the modulating frequency by tone decoders. The abnormal indication is presented to the operator by a display marked with a plan view of the vehicle having an LED marking each tire.

1 Claim, 5 Drawing Figures

CONTINUOUS HEAT AND PRESSURE SURVEILLANCE SYSTEM FOR PNEUMATIC TIRES

BACKGROUND OF THE INVENTION

The present invention relates to apparatus for remotely monitoring vehicle tire pressure and temperature.

With the increasing replacement costs of pneumatic tires, as well as the service charges and time lost for replacement, it is imperative that the tires be maintained at the proper pressure, to prevent unnecessary wear or high temperatures which may damage the tire. This is especially important for commercial vehicles such as trucks, buses and aircraft. Safety considerations likewise dictate that tires be always maintained at their rated pneumatic pressure.

In the prior art, various systems have been formulated for remotely monitoring the tire pressure and temperature of a motor vehicle. These have generally been provided with pressure and temperature sensors mounted to the wheel valve stem or rim, including a positive temperature coefficient thermistor mounted to the rim for sensing temperature, in U.S. Pat. No. 3,852,717 to Hosaka, and a pair of bellows-type pressure sensors coupled to the valve stem in U.S. Pat. No. 2,860,321, to Strickland. In U.S. Pat. No. 4,067,235 to Markland, a pressure sensor only is shown mounted within the tire. The tire condition information has been transmitted to the vehicle by slip rings or various electromagnetic means. Power for the sensors and transmitter has been provided directly by the vehicle battery, by a complex transponder-type system, such as in the Markland patent, or by a battery, as in U.S. Pat. No. 4,090,172 to Vesnic.

SUMMARY OF THE INVENTION

An object of the present invention is to provide a simple and inexpensive tire condition monitoring battery-operated transmitter which may be secured within a tire upon mounting and which will function reliably for a number of years without the necessity of access to the transmitter for repairs or replacement. A further object is to provide such a device which accurately senses the true temperature of the tire itself, as well as accurately senses deviation from normal tire pressure. Another object is to provide such a transmitter which can be easily set, without the aid of complicated equipment, to indicate by its signal the particular tire in which it is mounted. A still further object is to provide a convenient display for indicating which tire is abnormal.

Briefly summarized, the present invention is comprised of a plurality of monitoring transmitters, one secured within each tire of a vehicle, and a single receiver mounted near the operator of the vehicle. Each transmitter has a long-life battery, such as of the lithium type, and a miniature FM transmitter which is actuated when, on occurrence of an alarm condition, power is supplied from the battery and which is modulated by a simple oscillator. The frequency of the oscillator is set by a trimmer potentiometer marked for a number of selected frequencies, such that each tire of the vehicle may be identified by a frequency. Before installing the transmitter, the installer simply rotates the potentiometer to the position marked for the frequency desired for that tire position.

A negative temperature coefficient thermistor, whose resistivity decreases rapidly in the temperature range above 90° C., is in series with the battery. At approximately 99° C., the thermistor actuates a transistor switch circuit which supplies power from the battery to the transmitter. A bellows-type pressure sensor, internally pressurized to approximately the normal tire pressure for the truck tire into which it will be installed, has contacts for abnormally high and low pressures by which to couple the battery to the transmitter.

Most of this circuitry, including the thermistor, is mounted on a printed circuit board which is affixed in thermal contact with the tire by an elastic adhesive material, such as uncured rubber, which overlays and secures the board to the inner side of the tire. This material thermally insulates the thermistor and other components from the air within the tire and protects them from shock forces.

The receiver serves to receive and demodulate signals from any of the transmitters. It is provided with a plurality of tone decoders, one for each oscillator frequency, to identify which tire is abnormal. The information is indicated by LED's positioned corresponding to vehicle tires on a display face marked with a plan view of the vehicle.

DESCRIPTION OF THE PREFERRED EMBODIMENT

The preferred embodiment of the present invention comprises a plurality of monitoring transmitters, one mounted within each tire of a tractor-trailer truck, or other motorized land or air vehicle, and a receiver mounted in the tractor near the driver to receive signals from the plurality of transmitters, where used for a tractor-trailer truck. Each transmitter, of the FM type, may be actuated by a high/low pressure switch to indicate abnormal pressure or by a thermistor circuit to indicate abnormally high temperature.

The thermistor is of the type which has a negative temperature coefficient and linearly decreasing resistance, so as to be substantially conductive, for these purposes, at above approximately 99° C. The pressure switch is of the bellows-type which is pre-pressurized to approximately the center of the normal tire load inflation range.

The signal transmitted is an FM carrier modulated by a triangle wave whose frequency is set by a trimmer potentiometer marked to denote a number of selected modulating frequencies, which permits setting each tire monitoring transmitter for a different modulating frequency. The receiver detects and demodulates the transmitted signals; a plurality of tone decoders are utilized to determine which modulating frequency is received, indicating which tire is abnormal. The abnormality is visually presented on a display panel whose face is marked with a schematic plan view of the vehicle and has LED's corresponding to each tire location and driven by its corresponding tone decoder.

The monitoring transmitter circuit board is mounted to the inner side of the tire by a slab of uncured rubber or adhesive overlaying the entire circuit board except for that portion mounting the pressure sensor. This arrangement is considered to place the thermistor effectively in thermal contact with the tire while insulating it from the air within the tire.

Figure 1:
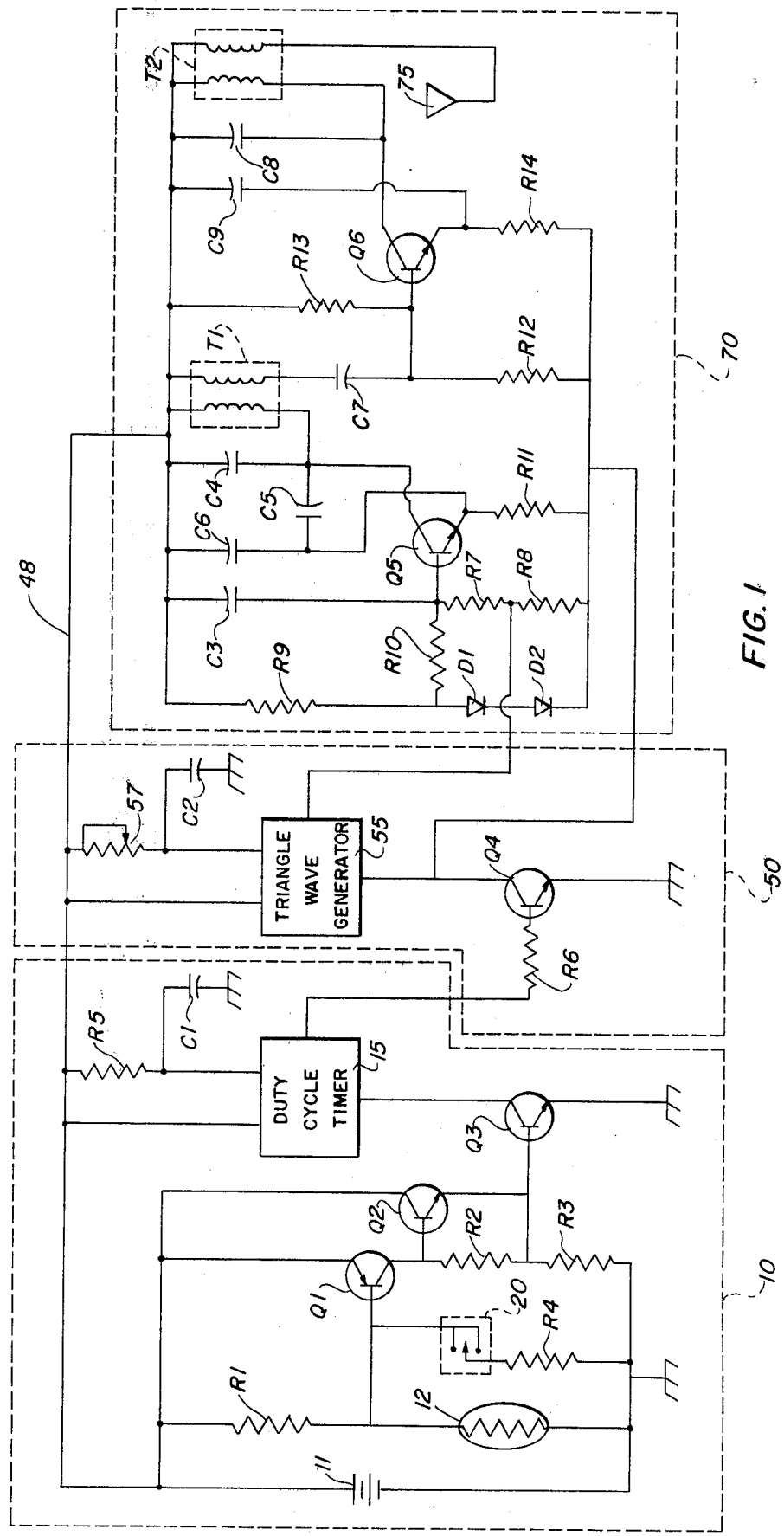
FIG. 1 is a circuit schematic of a tire monitoring transmitter embodying the present invention.
Figure 4:
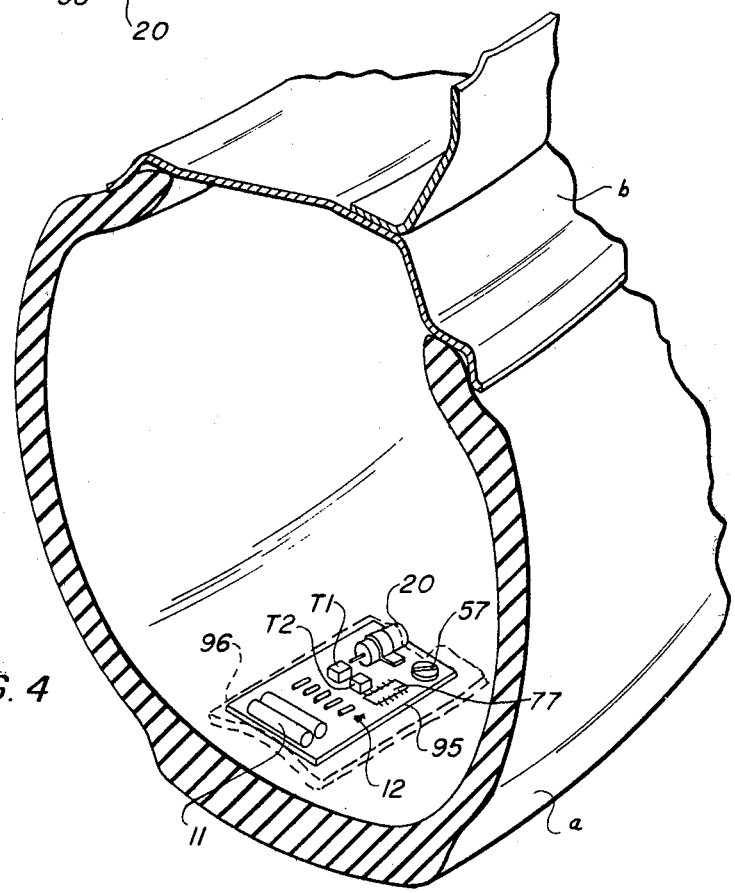
FIG. 4 is a cut-away perspective view of a tire showing the monitoring transmitter mounted on a circuit board secured to the inner side of the tire.

Described in detail, the monitoring transmitter, shown in schematic in FIG. 1 and mounted on a printed circuit board in FIG. 4, is made up of a sensing section, generally designated 10, a triangle wave oscillator or generator circuit, generally designated 50, and an FM transmitter, generally designated 70. In the preferred embodiment, the sensing section 10 includes a pair of lithium sulfur dioxide power cells 11, such as those manufactured by Power Conversion, Inc., of Mount Vernon, NY. These are shown in FIG. 1 as a battery 11. The series combination of these two power cells 11 produces a voltage supply of about 6.0 volts which will operate to −65° F. and show little degradation at temperatures up to 200° F. Calculations show that they will operate, with the minimal current drain in this use, for seven years. The negative terminal of the battery 11 is to the circuit board ground.

The sensing section 10 also includes a bead thermistor 12 of the negative temperature coefficient type, meaning that the resistance of the thermistor decreases with increasing temperature. The thermistor 12 and power cells 11 are coupled in a series circuit with a voltage divider resistor R1 which is of such value that the current is approximately 4 microamps at about 30° C., a minimal drain. In operation, the current increases nearly linearly to approximately 15 microamps at 90° C. and then increases more sharply. A pnp transistor Q1 has its base coupled to the connection of the thermistor 12 and voltage divider resistor R1. The transistor Q1 has its collector coupled by a pair of series-connected biasing resistors R2, R3 to the negative terminal of the battery 11 at the circuit board ground, and its emitter coupled to the positive terminal of the battery 11. The collector of the transistor Q1 is also coupled to the base of an npn transistor Q2, whose collector is connected to the positive terminal of the battery 11, and whose emitter is coupled to the common terminal of the series biasing resistors R2, R3.

The sensing section 10 also includes a high/low pressure sensor switch, generally designated 20, having a switch contact for abnormally high pressure and a switch contact for abnormally low pressure, each coupled to the base of transistor Q1. The moving contact of the switch is connected through a limiting resistor R4 to the circuit board ground.

Figure 3:
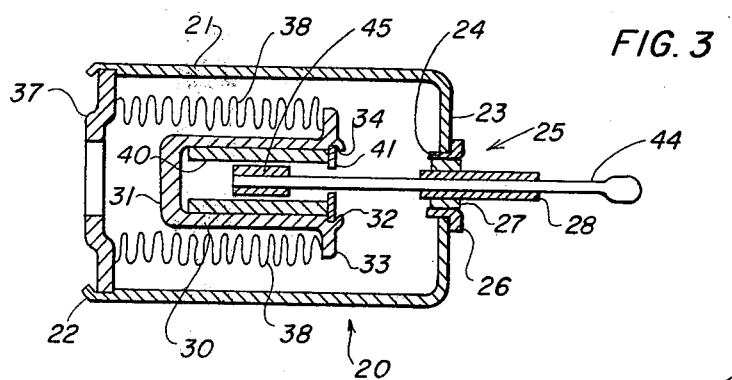
FIG. 3 is a cross-sectional view of the pressure sensor utilized in the monitoring transmitter of FIG. 1.

The construction of the pressure sensor 20 is shown in FIG. 3. The sensor 20 includes an outer cup 21 with an open end 22 and a closed end 23, the closed end 23 including a central bore 24 mounting an insulator insert, generally designated 25. The insulator insert 25 is made up of an outwardly flanged ring 26, a radially inward glass insulator ring 27 and a center tubular portion 28. A smaller diameter inner cup 30 is mounted axially within the outer cup 21 with its closed end 31 adjacent the outer cup open end 22 and its open end 32 adjacent the outer cup closed end 23. The inner cup open end 32 has an outward flange 33 and an inner annular groove 34, while the outer cup open end 22 mounts a radially inward flange 37. A tubular bellows 38 is mounted between the outer and inner cups 21, 30 and connects the inward flange 37 mounted on the outer cup 21 to the outward flange 33 of the inner cup 30, a seal being formed at each end.

The inner cup 30 receives an inner longitudinal insulator tube 40 held in place by a retaining contact ring 41 fitted within the inner annular groove 34 of the inner cup open end 32. A small diameter tubular lead 44 passes through the center tubular portion 27 of the outer cup insulator insert 24 and into the inner cup 30 through the retaining contact ring 41. The tubular lead 44 is fixed in position during construction of the sensor by flattening of the center tubular portion 27 of the outer cup insulator insert 24. On its inner end, the tubular lead 44 bears an inner switch contact 45. In construction of the pressure sensor 20, the tubular lead 44 is utilized to pre-pressurize the sensor in the enclosed volume within the inner cup 30, outward of the bellows 38, and inward of the outer cup 21 to a pressure of approximately 90 psi, the center of the normal load inflation range for certain truck tires. Once the unit is pre-pressurized, the tubular lead 44 is pinched shut. Where other types and sizes of tires are utilized, the internal pressure should be near the normal tire pressure, at approximately the center of the normal load inflation range.

In the preferred embodiment as shown in FIG. 1, the sensing circuit 10 further includes another npn transistor Q3 whose base is coupled from the emitter of transistor Q2 and whose emitter is coupled to the circuit board ground. A conventional duty cycle timer circuit 15, shown in block diagram form, is coupled to the collector of transistor Q3 and to the power supply bus 48, whereby when transistor Q3 is conducting, the duty cycle timer 15 cycles on and off. The duty cycle timer 15 receives a second input from the power supply bus 48 by a timing resistor R5. That same input is coupled to the circuit board ground by a timing capacitor C1. The values of the timing resistor R5 and capacitor C1 set the duty cycle of the timer 15.

The cycling output of the duty cycle timer 15 is coupled to the triangle wave generator circuit 50. In this circuit 50 the timer 15 drives the base of another npn transistor Q4 through a coupling resistor R6. The emitter of transistor Q4 is connected to the circuit board ground and a conventional triangle wave generator 55, shown in block diagram form, is coupled to the collector of transistor Q4 and to the power supply bus 48, so that it receives power from the battery 11 when transistor Q4 is conducting. The triangle wave generator 55 receives a second input from the power supply bus 48 by a trimmer potentiometer 57, such as of the flat-pack type manually-adjustable by a screw-driver. That input is also coupled to ground by a timing capacitor C2. The combination of the potentiometer 57 and capacitor C2 set the triangle wave frequency, in the preferred embodiment, in the range of 1–10 KHz.

The output of the triangle wave generator 55 is connected to the FM transmitter 70, as is the power supply bus 48. The collector of the transistor Q4 is connected to the common 71 of the FM transistor 70. When transistor Q4 conducts, the transmitter 70 is connected to the circuit board ground, completing the circuit for power to be supplied from the battery 11 via the power supply bus 48.

The FM transmitter 70 includes a modulating transistor Q5 whose base is coupled to the power supply bus 48 by a capacitor C3 and to the transmitter common 71 by a pair of series resistors R7, R8. The output of the triangle wave generator 55 is coupled to the common terminals of resistors R7 and R8. A biasing resistor R9 is coupled from the power supply bus 48 to a pair of series diodes D1, D2, cathode to anode, with the anode of diode D1 to the biasing resistor R9 and the cathode of diode D2 to the common 71. The base of transistor Q5 is coupled to the common terminal of resistor R9 and diode D1 by a biasing resistor R10.

The collector of the modulating transistor Q5 is coupled through the primary of a first transformer T1 to the power supply bus 48. A capacitor C4 is in parallel with the primary of the transformer T1; a second capacitor C5 coupled from the primary of transformer T1 and a third capacitor C6 coupled from the power supply bus 48 are connected to the emitter of the modulating transistor Q5, which is also coupled by an emitter resistor R11 to the transmitter common 71.

The secondary of the transformer T1 is coupled from the power supply bus 48 through a coupling capacitor C7 to the base of an output transistor Q6, whose base is also coupled to the transmitter common 71 by a ground reference resistor R12 and to the power supply bus 48 by a biasing resistor R13. The collector of the output transistor Q6 is coupled by the primary of a second transformer T2 to the power supply bus 48. A capacitor C8 is in parallel with the primary of the transformer T2. The emitter of transistor Q6 is coupled by a capacitor C9 to the power supply bus 48 and by a biasing resistor R14 to the transmitter common 71. The secondary of the transformer T2 is coupled from the power supply bus 48 to an antenna 75, which is printed on the monitoring transmitter circuit board.

The transistors, diodes and resistive circuit elements of the transmitter 70 may be provided by an integrated circuit such as the ECG 1014, manufactured by GTE Sylvania Incorporated, though in the preferred embodiment, the entire sensing circuit 10, triangle wave generator 50 and transmitter 70 are included in a single integrated circuit 77, with the pressure sensor 20, capacitors C1-C8, thermistor 12, power cells 11, and transformers T1, T2 mounted adjacent.

In FIG. 4, a circuit board 95, mounting the integrated circuit 77, power cells 11, thermistor 12, pressure sensor 20, transformers T1 and T2 and the numerous capacitors C1-C8, is shown mounted within a gas or air-inflated tire a on a rim b. The pressure sensor 20 is mounted on one end of the board 95. A slab of uncured rubber 96, shown in dashed lines, overlays the circuit board 95, leaving exposed only the outer cup open end 22 of the pressure sensor 20, and is affixed to the inner side of the tire casing a, flexibly mounting the circuit board 95 in place. The bead thermistor 12 and the other circuit elements are then in thermal contact with the tire a and insulated from the air within the tire a, whereby to measure the tire casing temperature rather than the tire air temperature, which is often cooler, and to maintain all the elements at a like temperature to avoid temperature compensation discrepancies.

Figure 2:
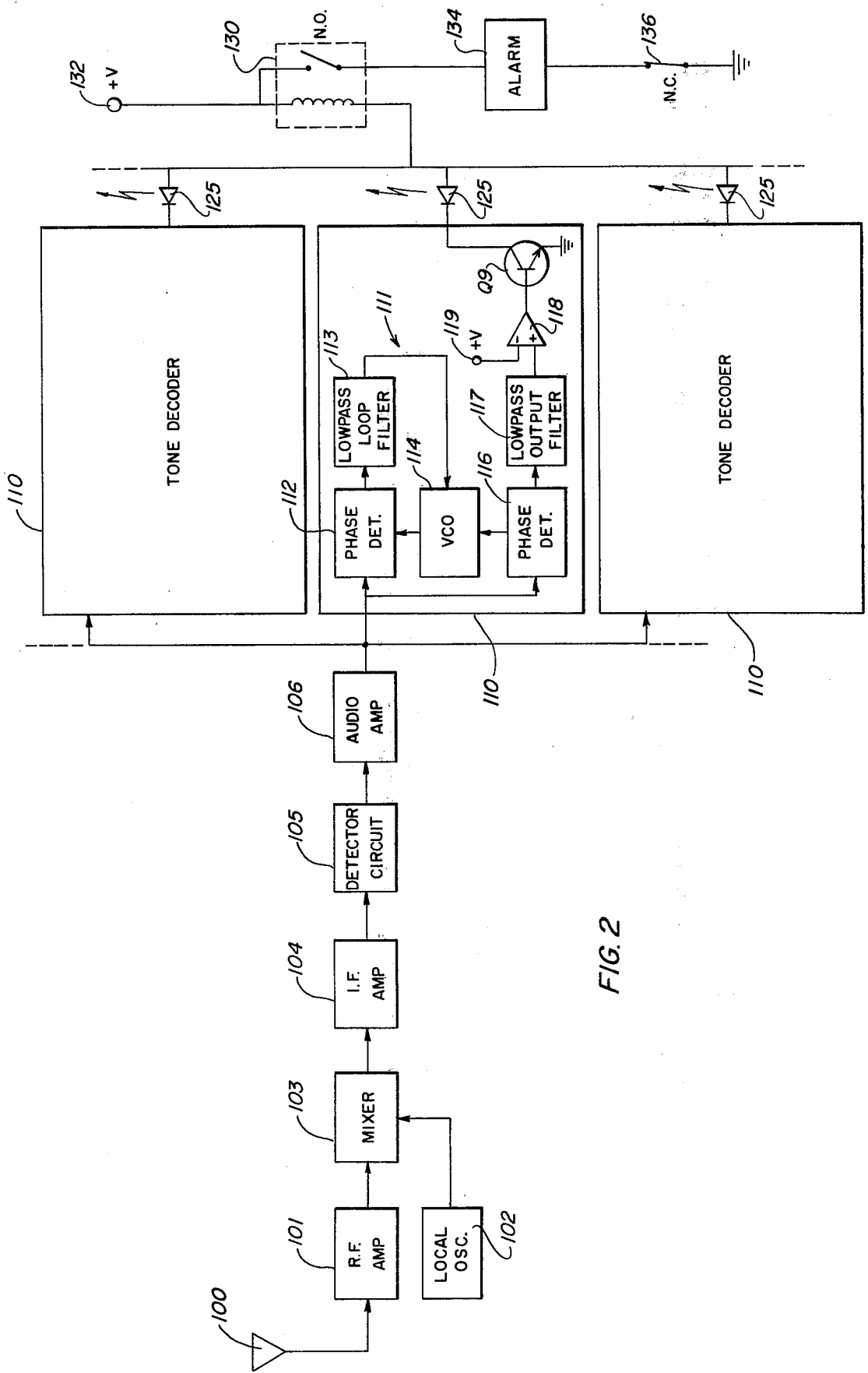
FIG. 2 is a circuit diagram, in block diagram form, of a receiver circuit embodying the present invention.

The receiver, shown in block diagram form in FIG. 2, is mounted within the operator's compartment of the vehicle adjacent to the operator so that information of abnormal tire condition may be presented to him in visual and audio form. The receiver includes a receiving antenna 100, coupled to a radio frequency (RF) amplifier 101. The RF amplifier 101, as well as a local oscillator 102 at a frequency of about 96.7 MHz, are coupled to a mixer circuit 103, which reduces the frequency of the signal to the intermediate frequency of 10.7 MHz. This signal is fed to an intermediate frequency (IF) amplifier 104, which is then coupled to a detector circuit 105, which recovers the triangle-wave signals from the IF frequency. The detector circuit 105 is coupled to an audio amplifier 106, which drives a plurality of tone decoders, each designated 110.

Each tone decoder 110 includes a phase lock loop 111 made up of a phase detector 112 receiving the input from the audio amplifier 106 and coupled through a lowpass loop filter 113 to a voltage controlled oscillator (VCO) 114. The VCO 114 is coupled to the phase detector 112, completing the phase lock loop 111. A second phase detector 116 receives an output of the VCO 114 which is 90° out of phase with the VCO output coupled to the phase detector and also receives the output of the audio amp 106. The output of the second phase detector 116 is coupled through a lowpass output filter 117 to the non-inverting input of an op amp comparator 118, whose inverting input is coupled to a reference voltage 119. The output of the comparator 118 is coupled to the base of an output transistor Q9, whose emitter is coupled to ground.

The collector of the output transistor Q9 for each tone decoder 110 is coupled from the tone decoder 110 to the cathode of a light-emitting diode (LED) 125. The anode of each LED 125 is coupled by the coil of a singular reed relay 130 to a positive voltage supply 132. The normally open contacts of the reed relay 130 are coupled from the voltage supply 132 through an alarm circuit 134 and a normally closed alarm shut-off switch 136 to the receiver ground.

Figure 5:
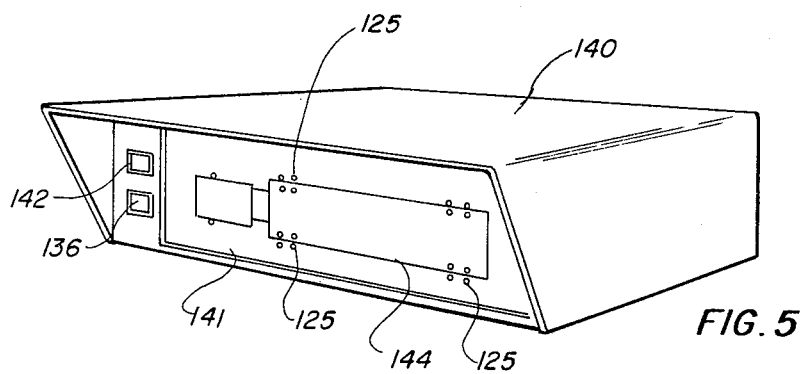
FIG. 5 is a cabinet view of a display panel embodying the present invention.

A display panel 140, shown in FIG. 5, is provided for mounting the receiver circuitry adjacent the operator and to indicate whether any tire is abnormal and, if so, to indicate which tire. The display panel 140 has a panel face 141 in which is mounted a power switch 142 and the audio alarm shut-off switch 136. The panel face 141 is marked with a schematic plan view 144 of the vehicle, in this case a tractor-trailer truck. The LED's 125 are mounted on the panel face 141 at locations corresponding to each tire of the vehicle.

Construction of the monitoring transmitter circuit board is by conventional printed circuit board techniques. The bellows pressure sensor 20 may be attached to the board by means of a strap, which also may serve as an electrical contact. In constructing the circuit board, after the circuit elements have been soldered in place, it may be dipped in a rubber-like material to aid in securing them against disconnection. Construction of the receiver apparatus, including tone decoders and display panel, will be easily performed by persons skilled in the art.

Installation of the monitoring transmitter within the tire is performed prior to mounting the tire a to the rim b.

Prior to the installation of the circuit board 95 in the tire a, the trimmer potentiometer 57 of the triangle wave generator 50 is adjusted, such as by a screwdriver, to the selected frequency corresponding to that tone decoder 100 which drives the LED 125 indicating the corresponding tire location on the display panel face 141. This is easily performed without use of expensive frequency metering equipment. The tolerances of the potentiometer 57 are sufficient that such an adjustment to a marked position will provide a modulating frequency within the bandwidth of the corresponding tone decoder.

The monitoring transmitter circuit board 95 is mounted on the inner side of the tire, preferably in the "foot" of the tire, because the tire temperature is generally highest at that point, though the board 95 may be mounted on the inner side of the sidewall, especially if tire balancing liquids are utilized. Next, a slab of uncured rubber 96 is fitted overlaying the circuit board leaving only the open end 22 of the pressure sensor outer cup 21 exposed. The uncured rubber slab 96 is pressed onto the inner side of the tire a at each side and on the end of the circuit board 95, where it adheres. As an alternative, the printed circuit board 95 may be attached by some other elastic mounting means, such as a flexible adhesive. Then, other means may be used to overlay the board to thermally insulate at least the thermistor 12, and preferably the other circuit elements, from the air within the tire a. By this alternative arrangement, the thermistor 12 and the other circuit elements are in effective thermal contact with the tire a. The resistance of the thermistor 12 is thus a function of the actual temperature of the tire and the other circuit elements are at a like temperature so that temperature compensation problems are lessened.

On normal operation of the monitoring transmitter, current flows through the series circuit of the battery 11, resistor R1 and thermistor 12, with only a minimal current drain. As the temperature of the tire a reaches a selected abnormally high level, the resistivity of the thermistor 12 will have dropped sharply. In the preferred embodiment, this selected level is approximately 99° C. As the resistance of the thermistor 12 decreases, the current through the thermistor 12 increases substantially and the voltage at the base of transistor Q1 decreases; at the selected level of 99° C., transistor Q1 begins to conduct and current is furnished to the base of transistor Q2, which then becomes conducting, drawing current from the positive terminal of the battery 11.

In operation of the monitoring transmitter, the position of the inner cup 30 of the bellows pressure sensor 20 varies according to the tire pressure. Since the tubular lead 44 and its switch contact 45 are fixed relative to the outer cup 21, the inner cup 30 moves relative to the switch contact 45. Where the pressure in the tire is 90 psig, corresponding to the pre-pressure of the sensor 20, the inner switch contact 45 is approximately mid-way betweeen the inner cup closed end 31 and retaining ring contact 41. As the tire pressure decreases from 90 psig, the inner cup 30 moves toward the outer cup open end 22. At the point that the pressure decreases to a selected abnormally low tire pressure, such as 75 psig, the retaining ring contact 41 contacts the inner switch contact 45 permitting current through the outer cup 20, bellows 38, inner cup 30 and retaining ring 41 to the inner switch contact 45 and tubular lead 44. This current flow causes transistors Q1 and Q2 to conduct. Likewise, on tire pressures exceeding the normal level, the inner cup 30 moves toward the outer cup inner closed end 23 until, at approximately 115 psi, the inner switch contact 45 contacts the inner cup closed end 31, completing the circuit and causing transistors Q1 and Q2 to conduct. In such operation, the retaining ring contact 41 serves as an abnormally high pressure switch contact and the inner cup closed end 31 serves as an abnormally low pressure switch contact.

When transistor Q2 conducts, transistor Q3 is caused to conduct, connecting the duty cycle timer 15, which is otherwise draining no current and whose output is off, to begin alternately cycling on and off. Though, in the preferred embodiment, the duty cycle timer 15 is made up of a conventional circuit fashioned on the integrated circuit with most of the other monitoring transmitter circuit elements, a conventional integrated circuit timer, such as the LM555 integrated circuit manufactured by National Semiconductor Corporation, may be utilized. The timer 15 may have an on duration of approximately 0.2 seconds and an off duration of several times that, whereby to minimize the current drain on the battery 11. In this preferred embodiment, the on-off duty cycle is set by the values of capacitor C1 and resistor R5. The circuitry actuated by the thermistor 12 or pressure sensor 20 to supply power to the triangle wave generator 50 and transmitter 70 is considered to be switch means.

The triangle wave generator 55 is, in the preferred embodiment, a conventional type circuit for producing a triangle wave signal, embodied in the integrated circuit of the monitoring transmitter. Use of the triangle wave may be advantageous in having lesser significant harmonics than other non-sinusoids, such as square waves.

The triangle wave generator 55 is actuated only when the duty cycle timer 15 is cycled on, causing transistor Q4 to conduct, completing the circuit to the triangle wave generator from the battery 11. The trimmer potentiometer 57 is adjusted to one of its pre-marked selected positions to produce the desired modulating frequency of 1-10 KHz.

Likewise, when transistor Q4 is caused to conduct, the transmitter 70 is actuated, while being modulated by the triangle wave oscillator 50, also then actuated. Since the diodes D1 and D2 are each of the silicon type having a voltage drop of approximately 0.6 volts when conducting, transistor Q5 receives a base input bias of approximately 1.2 volts through resistor R9, biasing the transistor Q5 in its linear operating range. The output of the triangle wave generator 55 is inputted to the modulating transistor Q5 through resistor R6, varying the transistor conductivity over its linear operating range. The changing conductivity of the transistor Q5 varies the resonant frequency (around 43 MHz) of the tank circuit formed by the primary of the transformer T1 and capacitors C4, C5, C6. Transistor Q6 is biased in its linear operating range by the voltage divider consisting of resistors R11 and R12. The 43 MHz carrier modulated by the triangle wave input is coupled from the secondary of transformer T1 through the capacitor C7 to the base of the transistor Q6. The tank circuit associated with the transistor Q6 has a resonant frequency at the second harmonic of the first tank circuit, approximately 86 MHz. The secondary of the transformer T2 couples this 86 MHz signal, modulated according to the 1-10 KHz triangle wave, to the antenna 75, from which it is radiated. The power output of the transmitter is sufficient to transmit the FM signal approximately 100 feet, sufficient to be received in the cab of a tractor when transmitted from a rearmost tire of its trailer.

Upon being detected by the antenna 100 of the receiver in the tractor cab, the signal is amplified by the RF amplifier 101 and mixed with the local oscillator frequency of 96.7 MHz; the resulting 10.7 MHz intermediate frequency signal is amplified in the IF amplifier 104. The IF signal is demodulated by the detector circuit 105 and amplified in the audio amplifier 106 before being inputted to each of the plurality of tone decoders 110, one corresponding to each vehicle tire in which a monitoring transmitter has been installed.

Each tone decoder operates as follows: the phase lock loop (PLL) phase detector 112, which receives outputs of the audio amp 106 and the VCO 114, produces an output having ac and dc components, the dc component being a function of the sine of the phase difference between the VCO signal received and the input from the audio amp 106. The lowpass loop filter 113 removes the ac portion of the signal so that the VCO receives only the dc component. The VCO 114 produces an output of a selected frequency when its input is zero, its output frequency varies about the selected frequency according to the VCO input. The bandwidth and response of the VCO is set by various timing components so that the PLL 112 will lock onto and track the triangle wave frequency if within the narrow bandwidth of the VCO 114. The VCO output to the second phase detector 116 is 90° out of phase with the VCO output to the phase detector, and where the PLL 111 is tracking the tone decoder input from the audio amp 106, it is also 90° out of phase with that input. Thus, when the PLL 111 is locked onto the tone decoder input frequency, the output of the second phase detector 116 is proportionate to sine 90°, or 1, its maximum. If the PLL 111 is not locked in, the output of the second phase detector will vary, generally as a beat frequency. The lowpass output filter 117 removes any ac, including the on-off component due to the duty cycle timer 15 and the beat frequency, but passes the dc component caused when the PLL 111 is locked; the op amp comparator 118 then goes high at its output, causing the output transistor 120 to conduct, whereby current flows through that LED 125 corresponding to the abnormal tire. This current flow causes the normally open contacts of the reed relay 130 to close, energizing the alarm circuit 134 to notify the operator that the condition exists. He may then open the normally closed alarm shut-off switch 136, causing the audio alarm 134 to cease. The LED 125 will continue to be lighted. At the first available opportunity, the operator should then inspect the abnormal tire for improper inflation or other abnormalities.

The advantages of the present tire condition monitoring system are numerous. For commercial success, the monitoring transmitter must be rugged, dependable, accurate and inexpensive, each a characteristic of the present invention. The pre-pressurized bellows-type pressure sensor is extremely accurate, since it is most sensitive to pressure changes within the normal tire load inflation range. By mounting the thermistor in substantial thermal contact with the tire casing, while insulating it from thermal contact with the air in the tire, the thermistor accurately indicates the temperature of the tire rather than the gas temperature, which is generally cooler. Use of the negative temperature coefficient thermistor whose conductivity so increases in the temperature range of the abnormally high temperature as to be substantially conductive, and otherwise draws only minimal current, permits use of small long-lifetime batteries, so that the tire monitoring transmitter may be mounted within the tire without requiring any connection to apparatus outside the tire, nor requiring demounting the tire from time to time to replace the batteries. Minimal current drain is further afforded by cyclically energizing the transmitter only upon an abnormal condition.

Use of a variable circuit element, such as the trimmer potentiometer marked for rotation to a number of selected positions indicating particular modulating frequencies, allows manufacture of one basic monitoring transmitter whose modulating frequency may be set differently for each tire, corresponding to its tone decoder. This permits installation of the transmitter by a tire dealer without use of any expensive electronic frequency metering equipment, for which the mechanic would have to be trained. The tone decoders are a particularly advantageous apparatus for determining which modulating frequency is being transmitted. The display panel, marked with the schematic plan view of the vehicle with LED's marking tire locations, quickly and easily relays to the operator, upon his hearing the alarm, which tire is abnormal. Since tractor-trailer trucks have dual wheels, for which the inner wheel is quite difficult to inspect, this system is highly advantageous.

Modifications of the above described preferred embodiment will be apparent to persons skilled in the art. For example, other electrical power source means may be utilized rather than the lithium power cells, such as other type batteries or a power transponder system. Other types of tire condition sensors may be utilized, including other pressure sensor switch means and other temperature sensors, or other switch or thermistor circuit means associated with a thermistor. Variable circuit elements may be associated with the pressure sensor or thermistor to indicate by their value, the tire condition. Other means for transmitting a radio signal may be utilized and other modulating signals, such as square waves or sinusoids, may be substituted for the triangle wave. The frequency of the modulating signal may be adjusted by other variable circuit elements, such as other types of variable resistors or a variable capacitor. Likewise, other tone decoder means may be utilized, where the carrier is modulated according to a selected frequency. Finally, other means to thermally insulate the thermistor and other circuit elements from the gas within the tire may be utilized, such as any material having elastic properties as well as insulating properties. From these suggestions, other modifications will be apparent.

We claim:

1. Apparatus mountable within a pneumatic tire of a motor vehicle for signaling to a receiver remote from such tire the increase of tire temperature above a selected normal and the deviation of tire pressure from a selected normal range, comprising a radio transmitter, a battery of the type which does not degrade substantially up to such selected normal tire temperature, and means for making a circuit between said battery and transmitter including pressure-sensing switch means to close upon deviation of tire pressure from such selected pressure range, and temperature-sensing switch circuitry having a switching state controlled by a transistor, the transistor having control electrode means to switch the transmitter from off to on in response to decrease of bias potential applied to said electrode, said circuitry further having a voltage divider network comprising a series circuit including
- (A) a substantially fixed resistance connected at one end to one terminal of the battery and
- (B) a negative temperature coefficient thermistor connected at one end to the other terminal of the battery, said resistance and said thermistor being connected together at their opposite ends to form a circuit node therebetween, said transistor control electrode being connected to said node, said thermistor being characterized by having such high resistance at such selected normal tire temperature as to be substantially nonconducting, and by having such decreased resistance at substantially greater temperatures as to become substantially conducting, whereby at and below such selected normal tire temperature, the high resistance of the thermistor will both substantially avoid current flow through the network and maintain such a bias potential on the transistor as to avoid actuating the transmitter.

* * * * *